(12) United States Patent
Hokoda et al.

(10) Patent No.: US 8,506,872 B2
(45) Date of Patent: Aug. 13, 2013

(54) METHOD FOR MANUFACTURING RESIN MOLD ASSEMBLY

(75) Inventors: Kazuaki Hokoda, Yokohama (JP); Yoshihiro Zaitsu, Okazaki (JP); Tatsuya Umeyama, Yokohama (JP)

(73) Assignee: Stanley Electric Co., Ltd., Tokyo (JP)

(*) Notice: Subject to any disclaimer, the term of this patent is extended or adjusted under 35 U.S.C. 154(b) by 430 days.

(21) Appl. No.: 12/788,861

(22) Filed: May 27, 2010

(65) Prior Publication Data

US 2010/0301522 A1 Dec. 2, 2010

(30) Foreign Application Priority Data

| May 29, 2009 | (JP) | 2009-129901 |
| Oct. 15, 2009 | (JP) | 2009-237927 |
| Oct. 28, 2009 | (JP) | 2009-247402 |

(51) Int. Cl.
*B29C 35/08* (2006.01)

(52) U.S. Cl.
USPC ...... 264/482; 264/445; 156/272.8; 219/121.6

(58) Field of Classification Search
USPC ...... 264/445, 482, 442, 443, 1.32; 219/121.6, 219/121.63, 121.64; 156/272.8
See application file for complete search history.

(56) References Cited

U.S. PATENT DOCUMENTS

| 5,624,585 A * | 4/1997 | Haruta et al. ............ 219/121.63 |
| 6,444,946 B1 | 9/2002 | Korte |
| 6,478,451 B2 | 11/2002 | Akiyama et al. |
| 6,592,239 B1 | 7/2003 | Akiyama et al. |
| 7,510,620 B2 | 3/2009 | Terada et al. |
| 7,935,908 B2 * | 5/2011 | Nakagawa et al. ...... 219/121.12 |
| 2002/0144984 A1 * | 10/2002 | Mori et al. ............... 219/121.64 |
| 2005/0167042 A1 | 8/2005 | Hofmann et al. |
| 2005/0266762 A1 | 12/2005 | Yasuda et al. |
| 2005/0284851 A1 | 12/2005 | Enoki et al. |
| 2006/0163214 A1 | 7/2006 | Yamazaki et al. |

(Continued)

FOREIGN PATENT DOCUMENTS

| DE | 198 08 569 A1 | 9/1999 |
| EP | 1 486 315 A2 | 12/2004 |

(Continued)

OTHER PUBLICATIONS

Extended European Search Report dated Oct. 7, 2010 (and English translation thereof) in counterpart European Application No. 10005585.4.

(Continued)

*Primary Examiner* — Joseph S Del Sole
*Assistant Examiner* — Nahida Sultana
(74) *Attorney, Agent, or Firm* — Holtz, Holtz, Goodman & Chick, P.C.

(57) ABSTRACT

In manufacturing a resin mold assembly, a first weld region of a light transmitting resin member and a second weld region of a light absorbing resin member are disposed facing each other, the first weld region of the light transmitting resin member and the second weld region of the light absorbing resin member are brought into pressed state in mutually facing direction, and a laser beam is scanned to make the laser beam be incident upon the light transmitting resin member, and repetitively radiated on the second weld region to heat and melt a whole of the first and second weld regions simultaneously, thereby welding the light transmitting resin member and the light absorbing resin member.

25 Claims, 10 Drawing Sheets

(56) References Cited

U.S. PATENT DOCUMENTS

| | | |
|---|---|---|
| 2007/0084553 A1 | 4/2007 | Nakajima et al. |
| 2008/0253000 A1 | 10/2008 | Matsunaga et al. |
| 2008/0264910 A1* | 10/2008 | Kashyap et al. ......... 219/121.61 |
| 2009/0211700 A1 | 8/2009 | Terada et al. |
| 2010/0276080 A1 | 11/2010 | Jansson |
| 2010/0303405 A1* | 12/2010 | Tagami ........................ 385/14 |
| 2011/0168672 A1* | 7/2011 | Harte et al. ..................... 216/65 |
| 2011/0203726 A1* | 8/2011 | Zaitsu et al. ............... 156/272.8 |

FOREIGN PATENT DOCUMENTS

| | | |
|---|---|---|
| EP | 1 714 771 A2 | 10/2006 |
| EP | 1 777 058 A2 | 4/2007 |
| EP | 1 777 058 A3 | 4/2007 |
| JP | 10-310676 A | 11/1998 |
| JP | 2000-294013 A | 10/2000 |
| JP | 2001-243812 A | 9/2001 |
| JP | 2003-123506 A | 4/2003 |
| JP | 2003-276087 A | 9/2003 |
| JP | 2004-014413 A | 1/2004 |
| JP | 2004-066739 A | 3/2004 |
| JP | 2004-261986 A | 9/2004 |
| JP | 2004-349123 A | 12/2004 |
| JP | 2005-119239 A | 5/2005 |
| JP | 2005-254618 A | 9/2005 |
| JP | 2005-262311 A | 9/2005 |
| JP | 2007-111926 A | 5/2007 |
| JP | 2009-038081 A | 2/2009 |
| WO | WO 2007/082992 A1 | 7/2007 |

OTHER PUBLICATIONS

Rofin Laser Micro: Dec. 31, 2002: XP007901547.
Potente H. et al.: "Investigations towards application of a new technique on laser transmission welding": May 1, 2001: XP001103411.
"Laserstrahlschweinben": Feb. 1, 2000: XP002312668.
Russek U et al.: "Laser beam welding of thermoplastics": Jan. 1, 2003: XP002312700.
Wilke L et al.: "Simulation of quasi-simultaneous and simultaneous laser welding": Jan. 1, 2008: XP001518325.
Japanese Office Action dated Jun. 4, 2013 (and English translation thereof) in counterpart Japanese Application No. 2009-129901.

* cited by examiner

METHOD FOR MANUFACTURING RESIN MOLD ASSEMBLY

BACKGROUND OF THE INVENTION

A) Field of the Invention

The present invention relates to a manufacture method for a resin mold assembly.

B) Description of the Related Art

A vehicle lightning instrument, for example, has often a resin mold product constituted of a housing and a lens welded together, the housing being made of light absorbing resin such as acrylonitrile styrene acrylate (ASA), and the lens being made of light transmitting resin such as poly methyl methacrylate (PMMA) and polycarbonate.

JP-A-10-310676 proposes housing composition capable of suppressing cobwebbing phenomenon during hot plate welding in which a hot plate is sandwiched between a lens and a housing to heat and melt the lens and housing and thereafter the hot plate is removed to weld the lens and housing.

JP-A-2000-294013 proposes laser welding in which a lens and a lamp body (housing) are brought into pressed state, a robot radiates a laser beam from the lens side toward the surface of the lamp body to heat and melt the lamp body, melting heat of the lamp body melts also the front portion of a seal leg on the lens side, and the laser beam is scanned along the whole circumference of the lens.

This Publication describes that a positioning groove may be formed on a receiving surface of the lamp body to prevent a positional shift of the seal leg so that laser welding is able to be performed in a state that a predetermined positional relation is held, and even if some burring occurs, the burring is able to be confined in the positioning groove.

JP-A-2001-243812 proposes to incline a bonding plane between a seal leg of a lens and a receiving surface of a lamp body to generate a slip and widen a beam spot diameter.

JP-A-2004-349123 proposes a method of welding a housing and a lens with a laser beam, including a case wherein the lens has a curved surface, in which method on the surface of the lens to be combined with the housing, are disposed an elastic light guiding member compatible with the lens shape and a flat transparent plate, a compressive load is applied through the flat transparent plate to the elastic light guiding member and the lens to make the elastic light guiding member contact the lens closely, and a laser beam is radiated from the flat transparent plate side to heat and melt the contact region of the lens and housing, via the elastic light guiding member and lens.

It cannot be said that a method of welding a resin mold assembly with a laser beam has been developed sufficiently.

It is desired to provide a method of manufacturing a resin mold assembly including a light transmitting resin member and a light absorbing resin member by using a laser beam, wherein the resin mold assembly has tight adhesion, excellent outer appearance, and high bonding strength.

SUMMARY OF THE INVENTION

According to one aspect of the present invention, there is provided a method for manufacturing a resin mold assembly, comprising the steps of:

disposing a light transmitting resin member on a light absorbing resin member in such a manner that a first weld region of the light transmitting resin member faces a second weld region of the light absorbing resin member;

applying a pressure between the light transmitting resin member and the light absorbing resin member to bring the first weld region of the light transmitting resin member and the second weld region of the light absorbing resin member in a pressed contact in a mutually facing direction; and applying a laser beam through the light transmitting resin member on the second weld region of the light absorbing resin member, and scanning the laser beam over a whole area of the second weld region, to repetitively radiating the laser beam on the second weld region to heat and melt a whole of the first weld region and second weld region simultaneously, and welding the light transmitting resin member and the light absorbing resin member.

An extended weld region may be divided into a plurality of weld lines in a width direction of the weld region.

The weld region may be slanted in the width direction to average a radiation energy density.

A temperature gradient may be formed in the width direction of the weld region to regulate a flow of molten resin.

Since the whole weld region is melted simultaneously, enhanced weld is likely to be obtained, and gaps are effectively removed from a region between the light transmitting resin member and light absorbing resin member. Formation of burring may be regulated preferentially on one side.

DESCRIPTION OF THE PREFERRED EMBODIMENTS

A light transmitting (transparent) resin member and a light absorbing (opaque) resin member are faced and contacted each other in pressed or pressured state, and a laser beam is radiated from the light transmitting resin member side. The laser beam transmits through the light transmitting resin member and reaches the light absorbing resin member. The laser beam is absorbed in and gives heat to the light absorbing resin member. Thus, the light absorbing resin member is heated, softened, and melted. Since the light transmitting resin member contacts the light absorbing resin member in the pressured state, heat in the light absorbing resin member is transferred also to the light transmitting resin member. The light transmitting resin member is therefore softened also, the contact region increases, and eventually the light transmitting resin member is also melted. Both the members are melted and welded. The present inventors have studied a laser welding method using a robot.

Figure 4A:
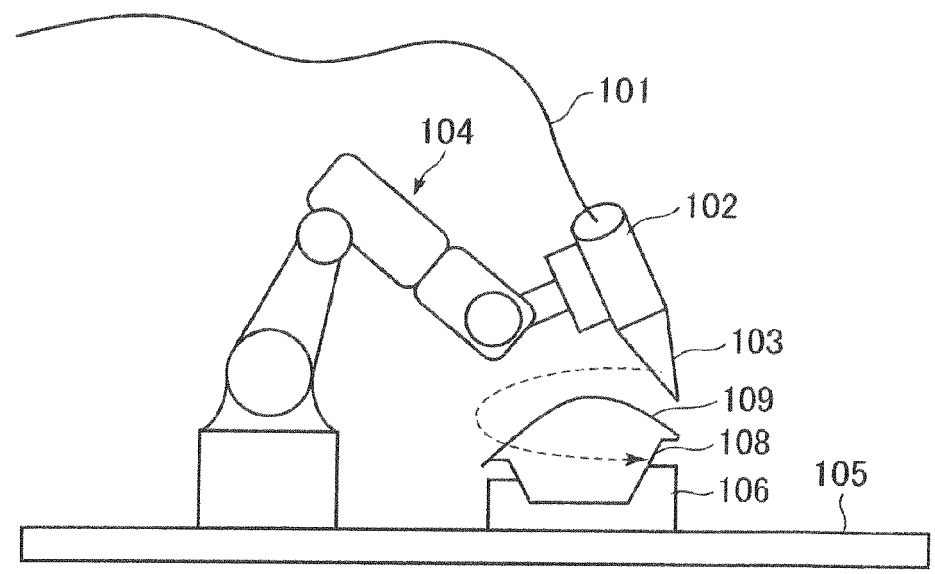
FIGS. 4A to 4C are a schematic side view of a laser welding apparatus, a top view of a weld region, and a cross sectional view of the assembly with temperature distribution in a weld region, for illustrating the study by the present inventors on the laser beam welding using a robot.

FIG. 4A is a side view illustrating the structure of a laser welding apparatus using a robot. A converging optical system 102 including an expander and a converging lens system is connected to the distal end of an optical fiber 101 connected to a laser source, and radiates a converging laser beam 103. The converging optical system 102 is held by a robot 104, and performs six-dimensional control including a three-dimensional position of the converging optical system and the propagation direction of the laser beam. A base 105 supports the robot 104 and a housing jig 106. The jig 106 supports a housing 108 made of light absorbing resin. A lens 109 made of a light transmitting resin is disposed on the housing 108. The lens 109 and housing 108 are held in a pressured state.

The robot 104 positions the converging optical system 102 at a predetermined start point, and makes the laser beam 103 emit and radiate toward the housing 108 via the lens 109. The surface region of the housing 108 radiated with the laser beam absorbs the laser beam and is heated, soften and melted. The lens 109 contacting the heated housing 108 is also heated.

Figure 4B:
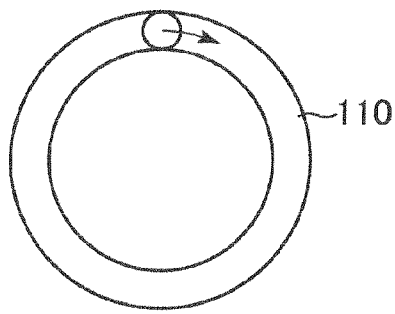

As illustrated in FIG. 4B, a weld region 110 set at a peripheral portion of the lens 109 has usually a loop shape. Laser radiation starts at the start point, the robot 104 moves the converging optical system along a loop, and after one turn of the loop, a welding process is terminated.

Figure 4C:
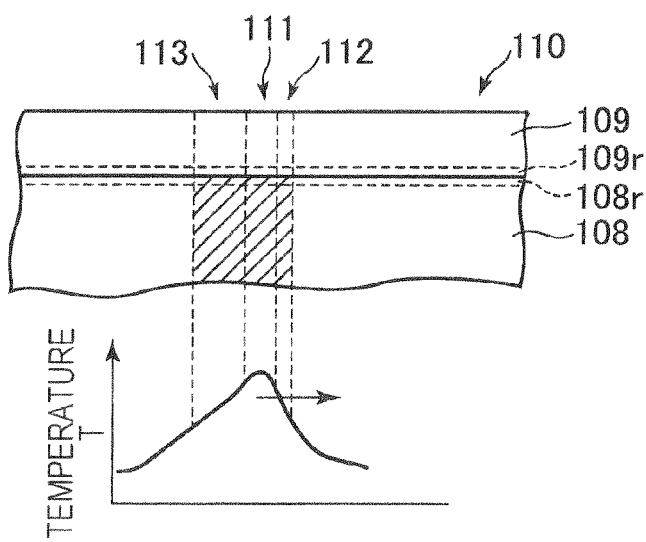

As illustrated in FIG. 4C, as the laser beam propagates, a molten region 111 and softened (glass transition) regions 112 and 113 before and after the molten region are formed in the weld regions 110 of the housing 108 (and lens 109). In the molten region 111, resin members of the lens and housing are melted and slightly depressed or crushed. In laser welding, a height of the crushed region is about 0.1 mm or lower.

The resin member surface has often projecting mold regions and uneven regions like a weld line. Uneven region on the housing upper surface is represented by 108r, and uneven region on the lens lower surface is represented by 109r. The projecting height is generally about 0.2 mm. The region where the laser beam does not transmit as yet, is in solid phase, and the projecting step is not still crushed. Contact between the lens and housing is hindered near at the projecting step, and a gap may remain. If the gap is not removed, there is a possibility that good welding is not performed. Even if a laser beam moves one turn along the weld region, there is a possibility that a region not welded is left and a welded state is not air tight.

This local weld defect is considered to be formed because heating and melting by laser beam radiation occurs only locally in the weld region. If the whole weld region is able to be heated and melted simultaneously like hot plate welding, it is expected that local weld defects can be improved.

The present inventors have studied high speed scanning of a laser beam to heat and melt the whole weld region. If a laser beam is repetitively radiated to the weld region at a pitch not allowing the object to cool down, temperature of the weld region is expected to be raised. It is considered however that it is difficult for a robot to perform such high speed scanning. A galvano scanner structure can be applied to achieve such high speed scanning of a laser beam.

Figure 1A:
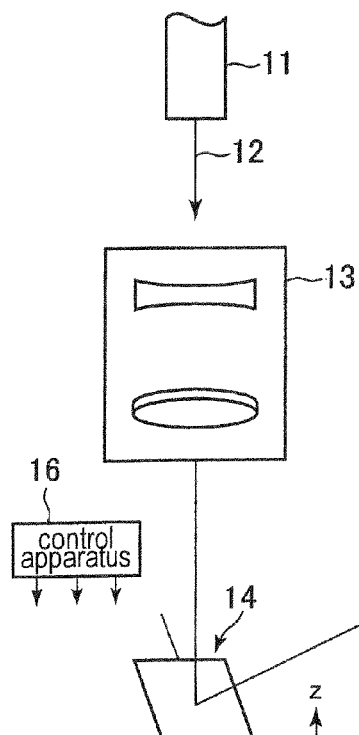
FIGS. 1A to 1F are a diagram illustrating welding by radiating a laser beam scanned by galvano mirrors to a (two-dimensional) weld region disposed on a flat surface, a cross sectional view of a processing target assembly, a plan view of a weld plane, a schematic perspective view illustrating the structure of a sample subjected to test radiation, a graph illustrating measurement results of the test radiation, and a diagram illustrating laser beam scanning for welding a circular stripe region.

FIG. 1A is a schematic diagram illustrating the structure of a laser beam welding apparatus using a galvano scanner. A focus adjusting optical system 13 is disposed facing to a laser beam 12 radiated from the distal end of an optical fiber 11 connected to a laser oscillator. The focus adjusting optical system includes a movable lens allowing a focal position on an optical path to be adjusted. A first galvano mirror 14 is disposed facing the laser beam radiated from the focus adjusting optical system 13 to perform, for example, x-direction scanning on a processing target plane. A second galvano mirror 15 is disposed facing a laser beam reflected from the first galvano mirror 14 to perform, for example, y-direction scanning on the processing target plane.

A control apparatus controls the galvano mirrors 14 and 15 and the focus adjusting optical system 13. An emitted laser beam 12s is able to be two-dimensionally scanned on the xy plane by the galvano mirrors 14 and 15, and to move a focal position along a z-direction by controlling a focal distance through adjustment of the focus adjusting optical system 13. Namely, a converged laser beam is able to be three-dimensionally scanned. A galvano mirror is light in weight and is able to perform high speed scanning.

A laser oscillator may be a laser oscillator of two-fold or three-fold wave YAG, a semiconductor laser, a fiber laser or the like. If only two-dimensional scanning is used, a scan head equipped with an fθ lens may be used in place of the focus adjusting optical system.

Figure 1B:
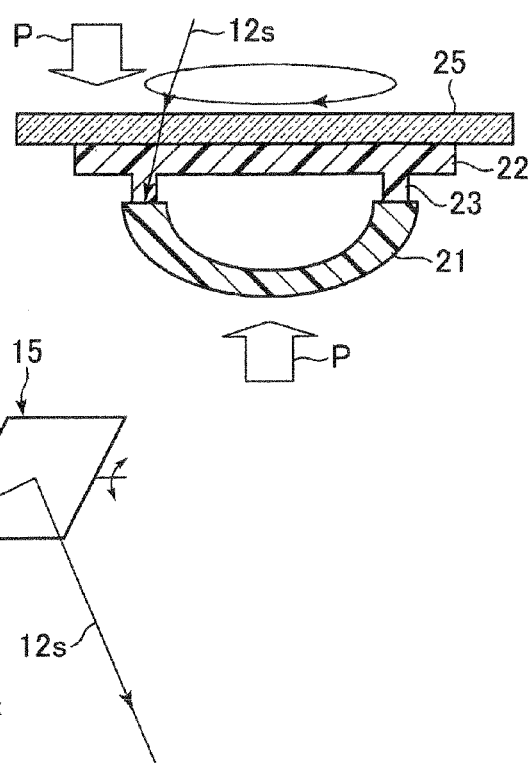

FIG. 1B is a schematic cross sectional view illustrating a processing target assembly or product having a weld region disposed on a two-dimensional plane. A lens 22 is disposed on a housing 21 of a vessel shape made of light absorbing resin, the lens being made of light transmitting resin, covering an opening of the housing 21, and facing the housing. In this example, a welding rib 23 is formed on the lower surface of the lens 22. The rib 23 is not an essential constituent element. A transparent pressure plate 25 is disposed on the lens 22 to bring the lower surface of the lens 22 into pressed contact with the upper surface of the housing 21, at a pressure P. The laser beam 12s is transmitted through the light transmitting pressure plate 25 and lens 22, and radiated on the upper surface of the housing 21 contacting the rib 23. The radiation position is scanned along the rib (weld region) by driving the galvano mirrors. The flat plane on which the weld region is disposed is represented by the xy flat plane. In the structure illustrated in FIG. 1A, the first galvano mirror 12 performs scanning along the x-direction, and the second galvano mirror 15 performs scanning along the y-direction.

Figure 1C:
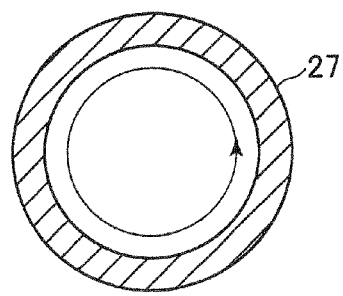

FIG. 1C illustrates an example of the shape of a two-dimensional weld region 27, the shape being a loop shape represented by a circular stripe. A laser beam is radiated repetitively scanning the loop. After the processing target product is placed at the position, the same position is subjected to laser beam radiation a plurality of times, from a state where a temperature of the resin member to be welded is at the initial temperature till a state where the weld region comes in a molten state. For example, the same position is subjected to the laser beam radiation a plurality of times until the same position reaches the softening temperature (glass transition temperature), and is further subjected to the laser beam radiation a plurality of times until the same position reaches a molten state. It is also possible to suppress bubble formation by gradually raising the temperature of light absorbing resin.

Figure 1D:
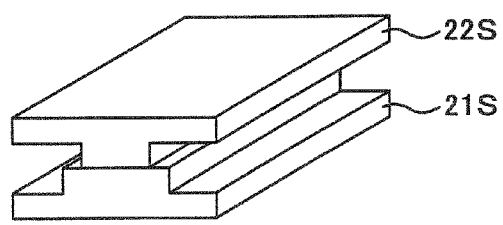

As illustrated in FIG. 1D, a sample was formed as a test piece, the sample having a lens 22s of light transmitting resin being disposed on a housing 21s of light absorbing resin. A rib is formed on each of opposing surfaces of the light absorbing resin housing 21s and light transmitting resin lens 22s. The weld region, i.e. the contact surface between the ribs of the lens 22s and the housing 21s, of the sample has a length of 15 cm and a width of 2 cm. Test radiation was performed for the sample. The housing has the rib of 3 cm in width, and the lens having the rib of 2 cm in width and 1 cm in height was disposed on the housing. The lens was made of PMMA and the housing was made of ASA. A temperature was measured with a thermocouple sandwiched between the lens and housing. Laser beam radiation was performed consecutively twenty times at a laser output of 200 W and a scan velocity of 4 m/sec. A positioning precision of a laser beam on the weld plane by the galvano mirrors is 50 μm or smaller. Time required for one scan is 37.5 msec. It is supposed that one scan of a weld line of a real product is over 1 m. In this test radiation, a constant interval is inserted after radiation of each scan of the weld line to simulate the welding process for a portion of a real product. In the test radiation, about 0.8 second was inserted as the interval.

Figure 1E:
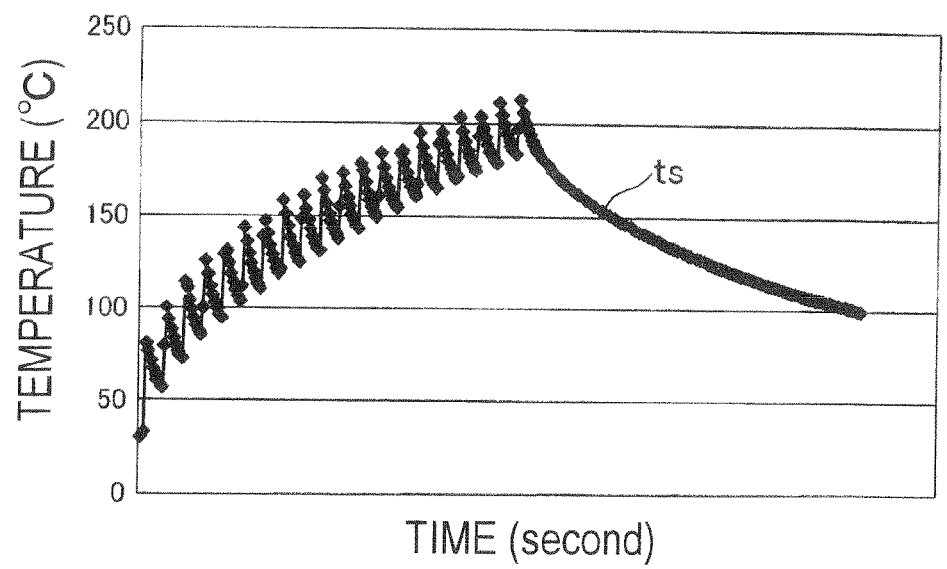

FIG. 1E is a graph indicating a change in the measured temperature of the sample is with time. A temperature rises, for example, by about 40 degrees per one laser beam radiation, and starts lowering after radiation. As the next laser beam is radiated before the temperature lowers to the temperature before radiation, the temperature rises again. An average temperature rises gradually by repetitive laser beam radiation. As the average temperature rises, a temperature rise range per one laser beam radiation lowers, and the whole change shape becomes an upward convex shape. When the position in the weld region is changed, a similar temperature change will be realized at a slightly shifted timing. It is apparent that the whole weld region is able to be heated approximately uniformly at the same time. After the test, the lens and housing were broken to take out the thermocouple. Although the temperature measured with the thermocouple is illustrated in the graph, the breakdown test indicates good welding of the lens and housing, and it is supposed that an actual temperature is higher than the temperature illustrated in the graph and reaches 240° C. or higher.

Figure 1F:
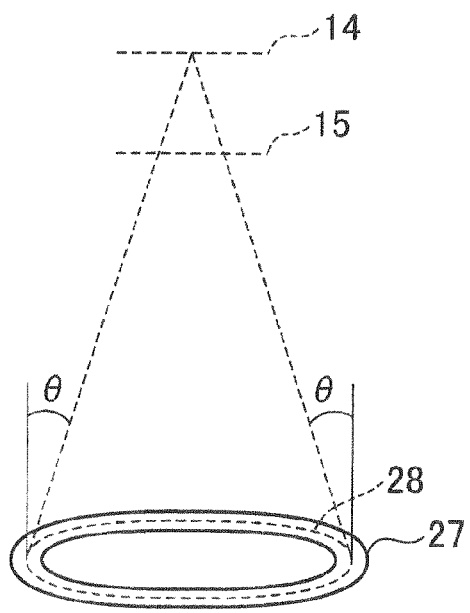

FIG. 1F is a diagram illustrating an optical system replacing reflection by galvano mirrors with rectilinear propagation. It is possible to consider that a laser beam incidence position of the first galvano mirror 14 is a position of a virtual laser beam light source. Rotation (swing) of the galvano mirrors 14 and 15 scans the laser radiation position in the two-dimensional flat plane. As the position of the virtual laser source in the xy plane is aligned with the center of the circular stripe weld region, an incident angle θ is constant at any position in the circular stripe weld region. As constant velocity scanning is performed, an incidence energy per unit time is constant at any position in the circular stripe weld region.

If the shape of the weld region is a shape greatly changing the distance from the virtual laser source, an incident angle changes and a radiation area will also change. If constant velocity scanning is performed, an incidence energy per unit time and unit area changes with the position, and the reached temperature will also change. In this case, it is preferable that the scan velocity is controlled in accordance with the incident angle or the distance from the virtual laser source to lower the scan velocity at the position where the incidence energy density lowers and uniformalize the temperature in the weld region. This control is able to be performed by the control apparatus 16.

Figure 2A:
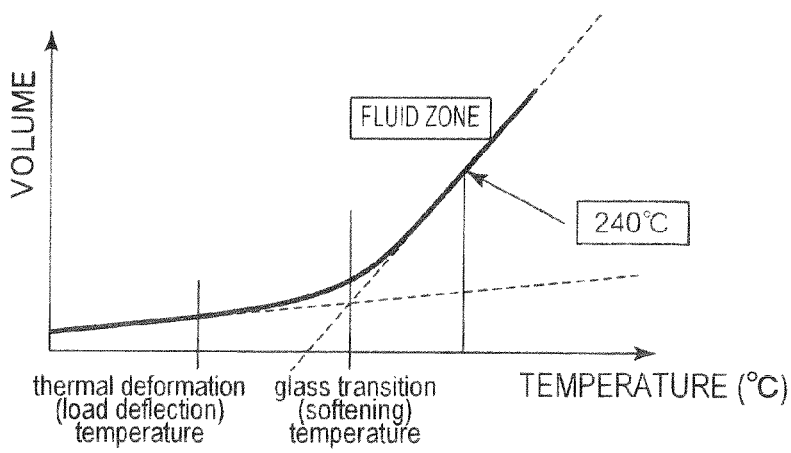
FIG. 2A is a graph illustrating volume change with temperature of a light absorbing resin.

FIG. 2A is a graph illustrating a relation between a volume and a temperature of an ASA resin. The ordinate represents volume of the ASA resin and the abscissa represents temperature. In some temperature range from the room temperature, the volume gradually and almost linearly increases with the temperature. As the temperature exceeds a load deflection temperature (thermal deformation temperature), the volume increase rate increases, and after the temperature exceeds a glass transition temperature (softening temperature), the volume increase rate transits to an almost linear volume increase rate at a steeper gradient. The ASA used is of a general grade, a load deflection temperature is about 95° C., and 240° C. belongs to the fluid zone.

Figure 2B:
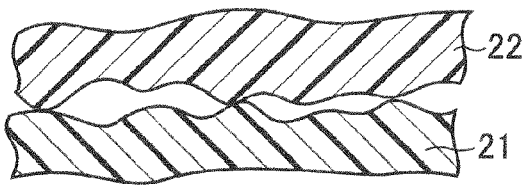
FIGS. 2B-2D are cross sectional views illustrating change in shape of abutting resin members caused by laser beam repetitive radiation.
Figure 2C:
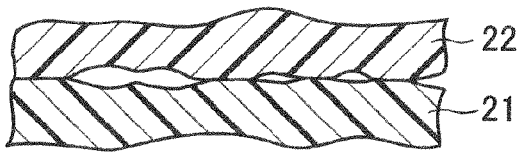
Figure 2D:
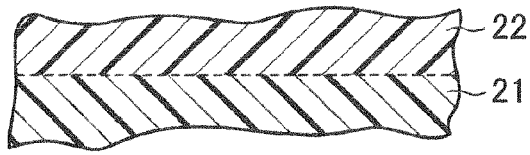

FIGS. 2B to 2D illustrate supposed changes in a weld region. FIG. 2B illustrates the state before softening. Local gaps exist between a housing 21 and a lens 22 due to protruding steps of the housing 21 and lens 22. FIG. 2C illustrates the state that the temperature of the housing exceeds a softening point and is before melting. The whole weld region of the housing becomes deformable, resin is planarized by an applied pressure, and gaps between the housing 21 and lens 22 reduce. FIG. 2D illustrates a molten state. Since the whole weld line enters the molten state (at least a combination of a softening state and a molten state), gaps between the housing 21 and lens 22 disappear and it is expected that the molten resin members 21 and 22 are melted, and mixed together to disappear the interface. It is expected that enhanced weld is likely to be obtained and gaps are hard to be left between the housing and lens.

Figure 2E:
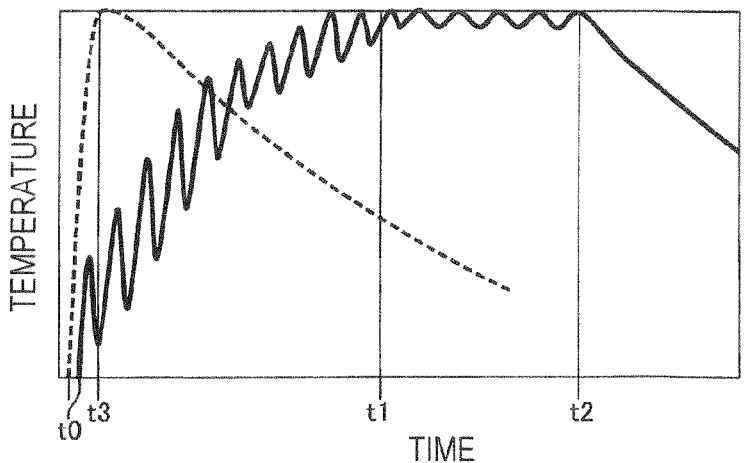
FIG. 2E is a graph illustrating temperature change of light absorbing resin relative to time of laser beam repetitive radiation.

FIG. 2E is a graph briefly illustrating change in temperature with time. A solid line indicates temperature change caused by repetitive laser beam radiation. From time t0 to t1, as a laser beam is repetitively radiated, temperature rise and fall are repeated similar to that illustrated in FIG. 1E, and the average temperature rises. From time t1 to t2, the molten region expands, and at least in a raised temperature state, the light absorbing resin enters a molten state, and both the resin members are pushed together. At time t2, welding is completed, and the temperature falls by natural cooling.

For the purposes of comparison, a comparative temperature change is indicated by a broken line when a robot performs laser radiation of one turn along the weld line. As a laser beam is radiated, temperature of the light absorbing resin rises to a molten temperature in a single laser shot at time t3. Even when the resin enters a molten state at a radiation position, the laser beam has not still been radiated or the temperature has fallen at other positions so that the resin at other positions is in a solid phase. Mutual pushing of the resin members is therefore restricted, and it will be difficult to completely remove the local gaps.

As laser beam repetitive radiation is performed on the same weld line, temperature of the whole weld line is raised, simultaneously or at the same time. The resin members will be softened and melted simultaneously or at the same time so that both the resin members are mutually pushed and local gaps are removed efficiently.

Figure 3A:
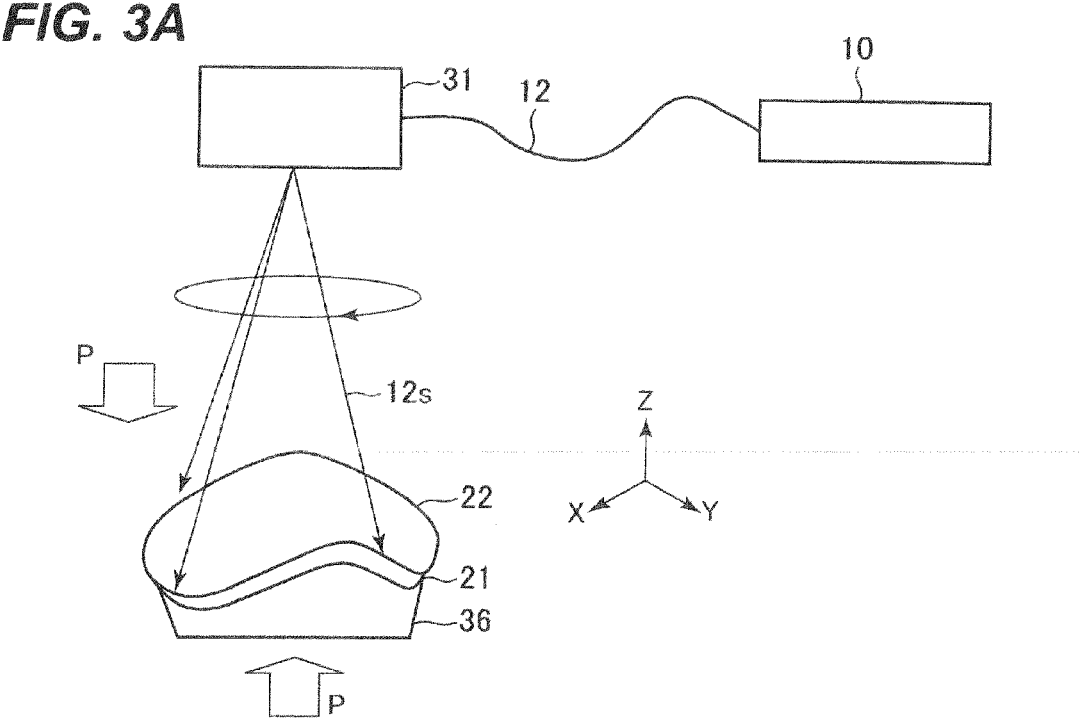
FIGS. 3A and 3B are a schematic perspective view and a cross sectional view illustrating welding by laser beam repetitive radiation to a three-dimensional weld region.

FIG. 3A is a schematic diagram illustrating laser beam welding by three-dimensional scanning. A laser beam radiated from a laser oscillator 10 is guided to a scan head 31 via an optical fiber 12. The scan head 31 has the structure including the focus adjusting optical system, x-direction galvano mirror, y-direction galvano mirror and control apparatus illustrated in FIG. 1A. A housing 21 made of light absorbing resin is disposed on a jig 36. The weld region of the housing has a three-dimensional structure, which cannot be accommodated in a two-dimensional plane. A lens 22 made of light transmitting resin and having a weld region corresponding to the weld region of the housing 1 is disposed on the housing 21, with both the weld regions facing each other. The lens 22 and housing 21 are pressed at a pressure P along a contact direction.

The scan head 31 scans a laser beam 12s along the weld region to repetitively radiate the laser beam. The galvano mirrors 14 and 15 control the position in the two-dimensional xy plane and the focus adjusting optical system 13 controls a z-direction focal distance to maintain a constant focal condition.

Figure 3B:
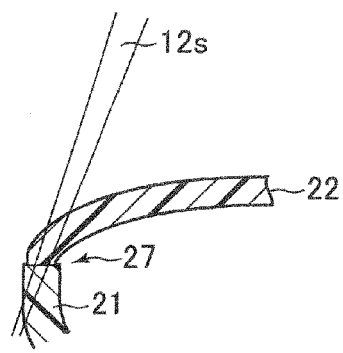

FIG. 3B illustrates an example of a focal condition. A converged laser beam 12s has a focal position at the back of the weld region 27, in a so-called rear focus state. Defocusing the weld region makes a wide area of the weld region be irradiated and melted, to obtain enhanced bonding. Defocusing may be obtained by front focus instead of rear focus.

As an example, a welding process was performed for a vehicle rear combination lightning instrument having a three-dimensional structure. A lens made of light transmitting resin material and a housing made of light absorbing resin material are welded at the weld regions of the three-dimensional structure. Welding was performed at one turn length of 1 m of the weld region, a laser output of 150 W, a scan velocity of 10 m/sec, and a total radiation length (200 turns) of 200 m. The breakdown test after the welding process indicated that no stripping was detected along the whole length and enhanced weld was obtained.

In the weld region of the three-dimensional structure, an incident angle and also a radiation area change. An incident angle at the light absorbing resin member surface may become about 60 degrees. As compared to vertical incidence, a radiation area at an incident angle of 60 degrees is doubled. If a rib is used, a rib width is desired to have a sufficient margin. A rib width is preferably 2 mm to 3 mm. A rib height is preferably 0.5 mm or higher for resin melting and pushing. If the whole height of a rib is to be melted and pushed, a rib height is preferably 1 mm or lower in order to suppress a radiation energy (laser output). In this case, a rib height is preferably 0.5 mm to 1 mm. Stable and good welding was obtained for example at a rib width of 3 mm and a rib height of 0.5 mm.

A laser beam is radiated to the light absorbing resin member via the light transmitting resin member. The upper surface of the light transmitting resin member also constitutes an optical interface, and reflects a laser beam. As an incident angle at the upper surface of the light transmitting resin member exceeds 70 degrees, an incidence efficiency into the resin member lowers greatly and is often practically unusable.

Figure 3C:
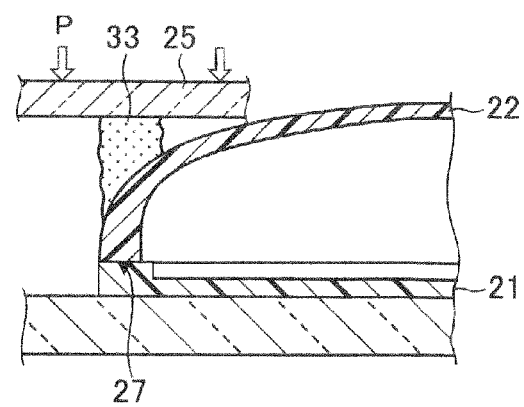
FIGS. 3C to 3E are a cross sectional view and diagrams illustrating modifications.

FIG. 3C illustrates a mode of inputting a laser beam from a light transmitting pressure plate 25 disposed via an elastic light transmitting member 33 matching the upper surface shape of the light transmitting resin member 22. The elastic light transmitting member 33 is made of, for example, transparent silicone resin. For the elastic light transmitting member, reference may be made to the disclosure of FIGS. 1 and 2 and Paragraphs [0007] to [0013] of JP-A-2004-349123 which is hereby incorporated by reference.

Figure 3D:
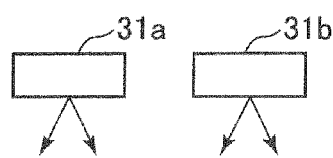

FIG. 3D illustrates a mode of radiating a plurality of laser beams at the same time from a plurality of scan heads 31a and 31b. The scan heads 31a and 31b may be supplied the laser beams from different laser sources or may be supplied the laser beams obtained by dividing a laser beam from one laser source. The laser beams are respectively assigned for respective sections of two or more sections obtained by dividing the weld region. As the radiation area is divided, each laser radiation area to be scanned by one scan head is narrowed so that it becomes possible to lower the maximum incident angle and enlarge the total laser radiation area.

The combination of the scan head(s) and the shape of weld region may take various configurations. In case when the laser beam is short of width relative to a weld region width, a plurality of weld lines may be set on the weld region, the weld lines having different positions in the width direction of the weld region, and a laser beam is radiated a plurality of times at each weld line.

Figure 3E:

As illustrated in FIG. 3E, a weld region 27 may be divided into a plurality of weld lines 27-1, 27-2 and 27-3. A laser beam is sequentially radiate to each weld line. The laser beam 12s is repetitively scanned on the weld lines 27-1, 27-2 and 27-3 of the weld region 27. Similar to the above-described embodiment, after a processing target assembly is placed at the position, the same position is subjected to laser beam radiation a plurality of times, from a state where a temperature of the resin member to be welded is at the initial temperature till a state where the weld region comes in a molten state.

In a welding process using galvano mirrors, since the laser source is fixed, a distance from the laser source may change with the laser irradiation position. An angle between a normal of the weld region and a laser beam, i.e., an incident angle, may change with the laser irradiation position. The area radiated by the laser beam changes with the incident angle. If constant velocity scanning is performed, an incidence energy per unit time or unit area may change with the position, and an arrival temperature may change with the position.

In order to observe differences of the arrival temperature caused by differences of the incident angle, samples having a weld region width of 2 cm and a weld region length of 15 cm were formed and test radiations were performed. The shape of the sample is similar to that illustrated in FIG. 1D. A laser source was disposed at a position of 50 cm above the sample center, and the sample surface was tilted along its width direction to set minimum incident angles of 0, 30 and 60 degrees to perform laser beam repetitive radiation. A thermocouple was sandwiched between the lens and housing to measure a temperature. The lens was made of PMMA, and the housing was made of ASA. At a laser output of 200 w and a scan velocity of 4 m/sec, laser beam radiation was performed consecutively twenty times. In this test, each time the weld line is radiated by one scan, an interval of about 0.8 sec was inserted to simulate the welding process for a portion of a real product.

Figure 5:
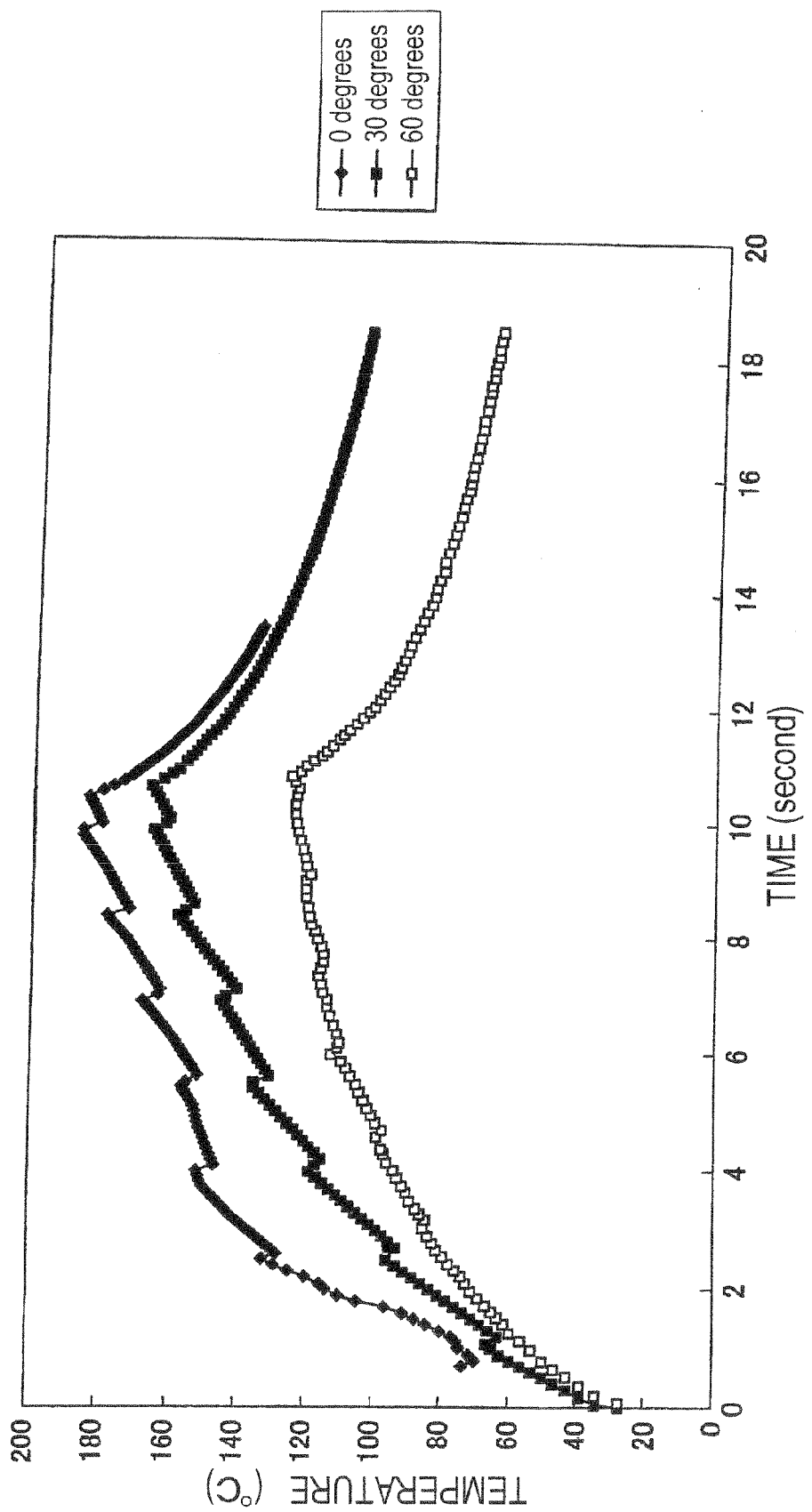
FIG. 5 is a graph illustrating temperature change of light absorbing resin relative to time of laser beam repetitive radiation, at different incident or incidence angles.

FIG. 5 is a graph illustrating temperature changes with laser radiation time, at the minimum incident angles of 0, 30 and 60 degrees. As seen from this graph, at the minimum incident angle of 0 degree, an arrival temperature of the weld region is about 190° C. at the maximum, whereas at the minimum incident angle of 60 degrees, the arrival temperature of the weld region is only about 130° C. at the maximum. It is seen that as the incident angle becomes large, the arrival temperature lowers relatively. It can be said from a different point of view that as the incident angle becomes large, a time taken to reach a necessary temperature prolongs.

A real product has often a complicated structure of a weld region, and has a three-dimensional structure in some cases. It is suggested that wide variations in the incident angle and the arrival temperature may appear in the weld region. In this case, there are possibilities of local excessive heating resulting in generation of bubbles, or defective welding because of insufficient heating resulting in no molten state. It is preferable to suppress the change in the incident angle of a laser beam to be radiated to the weld region and suppress the arrival temperature variation. The present inventors have studied a processing target structure capable of suppressing a variation in the incident angle and the arrival temperature in the weld region, in the welding process using galvano mirrors.

Figure 6A:
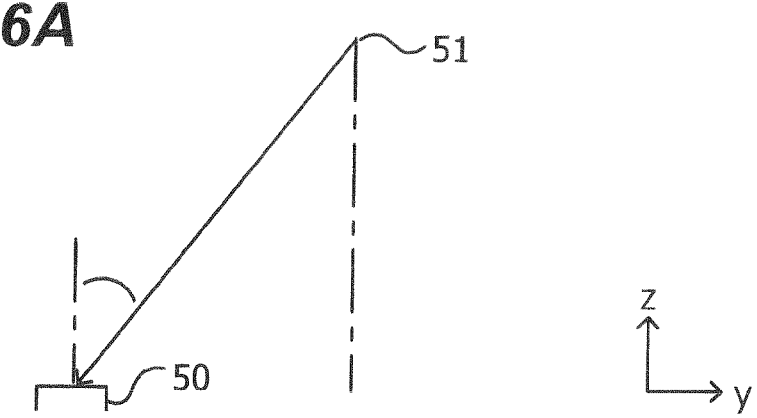
FIGS. 6A to 6C are diagrams illustrating change in an incident angle with change in distance from the laser source, and a method of compensating the change in the incident angle.
Figure 6B:
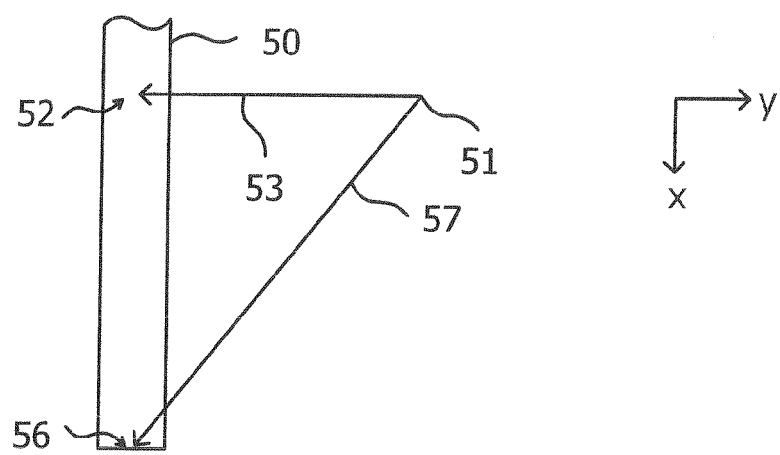

FIGS. 6A and 6B illustrate an example of the change in the incident angle of a scanned laser beam from a fixed laser source. FIG. 6A is a side view, and FIG. 6B is a top view. A stripe-shaped weld surface 50 extending in the x-direction is radiated with a laser beam from a laser source fixed at a position 51 spaced by 40 cm in the y-direction and 50 cm in the z-direction. A laser beam 53, propagating at a right angle to a position 52 of the weld plane 50 when seen in the horizontal plane as shown in FIG. 6B, the propagation being slant incidence as shown in FIG. 6A, reaches the weld plane 52 at an incident angle of about 39 degrees. A laser beam 57 propagating to a position 56 spaced by about 50 cm in the x-direction from the position 52 when seen in the horizontal plane as shown in FIG. 6B, reaches the weld plane 56 at an incident angle of about 53 degrees. The incident angle changes largely. Consider now that the weld plane is tilted. The weld plane at the position 56 is tilted to face toward the laser source 51. A laser beam incident angle of about 39 degrees can be realized. Then, the incident angle becomes approximately equal to that at the position 52. It is seen that the change in the incident angle can be suppressed by inclining the weld surface in the width direction, gradually from the position 52 to position 56, to face toward the laser source. When the position is further spaced from the position 56, the incident angle increases further.

Figure 6C:
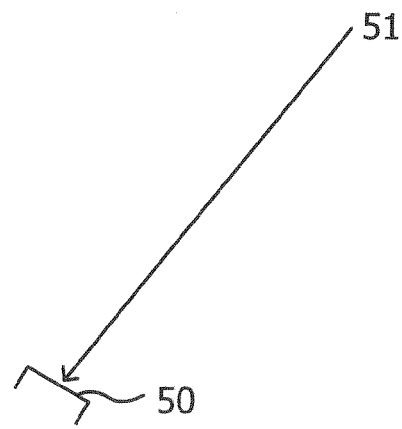

As illustrated in FIG. 6C, at the position having the maximum incident angle in the weld region, the weld plane is tilted in a width direction to lower the incident angle, for example, to maximize the energy density. At other positions, the weld plane is tilted in a width direction to realize a constant incident angle, or at least to suppress the variation in the incident angle. As a change in the incident angle is suppressed, changes in the incidence energy density will be suppressed and the arrival temperature will be uniformalized.

As the weld plane is tilted in the direction toward the laser source, the incidence energy density increases, and as the weld plane is tilted in the direction away from the laser source, the incidence energy density reduces. Changing the position of the weld plane in the z-direction is not permitted usually. The weld plane is therefore tilted in the width direction. Although the weld region is disposed on a two-dimensional plane in the above description, this embodiment is similarly applicable to the three-dimensional structure of the weld region.

Considering an intensity distribution (e.g., Gauss distribution) of a laser beam itself, the weld region tilted in the width direction may be a curved plane instead of a flat plane. This modification may further contribute to uniformalization of the temperature deviation in the radiation plane.

There may occur some limit in uniformalization of the incident angle, the incidence energy density and the arrival temperature by tilting the weld plane.

Variation in the arrival temperature along a laser scan direction can be suppressed by controlling the laser beam scan velocity in accordance with an incident angle. For example, at the position where an incident angle becomes large and an incidence energy and the heat generation per unit area reduces relatively, it is preferable to lower the scan velocity to increase the heat generation per unit time to thereby uniformalize the temperature deviation in the laser scan direction. This control can be preformed by the control apparatus 16 illustrated in FIG. 1A.

As described above, by continuously tilting the weld surface in the width direction, in response to a virtual incident angle when the width direction of the weld region is parallel to the horizontal plane, the incident angle change in the weld region can be suppressed. By controlling also the laser scan velocity, the whole weld region can be heated, melted and welded almost at the same time or simultaneously, in the state that the arrive temperature variation is suppressed.

When the weld region enters the softening and molten state, deformability and fluidity are provided.

Figure 7A:
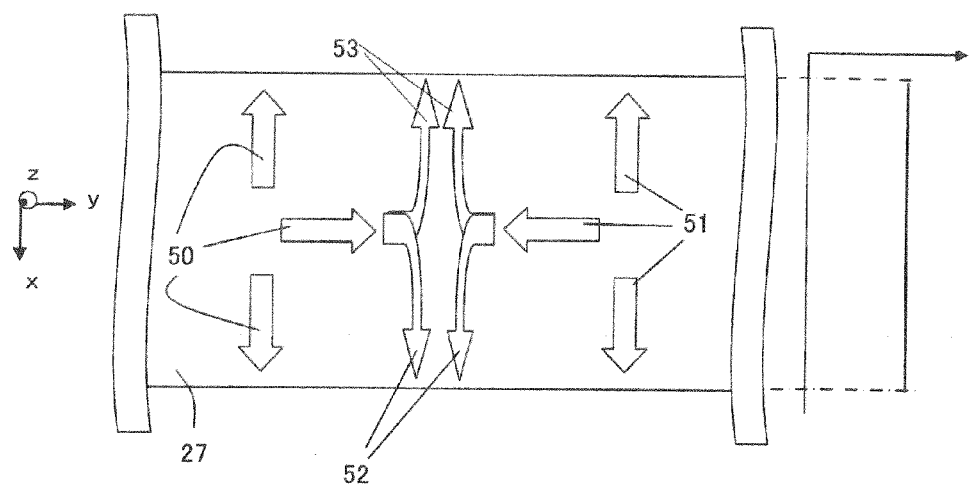
FIGS. 7A to 7C are a schematic plan view illustrating a liquid flow when the weld region melts at a uniform temperature, a schematic cross sectional view illustrating burring formation, and a schematic plan view illustrating a liquid flow when the weld region is provided with a monotonic temperature gradient.

FIG. 7A is a plan view illustrating plane-like molten state of a weld region sandwiched between the up-and-down solid state regions. Molten resin tends to radially extend by pressure, while burying gaps, flows to the outside in the width direction (up- and down direction in FIG. 7A) as indicated by arrows 50 and 51 or arrows 52 and 53.

Figure 7B:
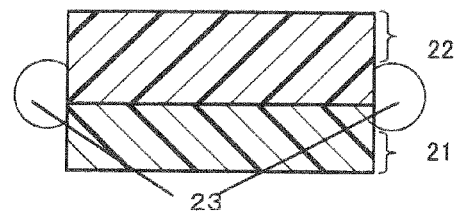

As illustrated in FIG. 7B, resin members 21 and 22 are mixedly melted, and gaps and the interface disappear to allow enhanced welding to be performed. At this time, molten resin members expelled out to the both sides of the weld region in the width direction form expelled regions 23 called burring. Formation of burring is not desirable because the outer appearance quality of the resin mold assembly is degraded.

In order to guarantee a bonding strength, it is necessary to fill the gaps with molten resin members and remove the gaps. In this case, molten resin members flow to the outside of the weld region to some extent. It will be difficult to completely suppress the formation of burring.

There is a preferred case if burring at both sides of the weld region can be formed selectively. For example, in the case of a resin mold product requiring hermetic seal, if burring is formed at the outside of a resin mold product, such burring can be removed at a later process. Then, the outer appearance quality of a final mold product is not degraded and enhanced bonding is obtained. Even in a case of a resin mold product not requiring hermetic seal, If burring is formed at one side of a resin mold product not, time for removing burring can be shortened, compared to a case of allowing formation of burring on both sides. It is preferable in terms of a production efficiency. If fluidity of molten resin can be restricted, burring formed at the outside of the weld region will be able to be restricted only to one side.

Generally, in liquid including a molten resin, there holds a negative correlation between temperature and viscosity. As a temperature of liquid becomes high, its viscosity reduces, and as a temperature of liquid becomes low, its viscosity increases. A viscosity of liquid is defined as a proportional constant representative of a relation between a flow of liquid and a resistance force against the flow. If liquid has a high viscosity, a resistance against the flow of liquid is high, whereas if liquid has a low viscosity, a resistance force against the flow of liquid is low. A negative correlation is therefore satisfied between a temperature of liquid and a resistance force against the flow of liquid. Therefore, there holds the relation that as a temperature of liquid becomes high/low, the viscosity reduces/increases, whereas as a viscosity reduces/increases, the resistance force against the flow reduces/increases also.

By using the above-described general properties of liquid, it will be possible to control the flow of molten resin, e.g. to flow toward a region having a low resistance force, by forming a temperature gradient in the weld region, and forming deviation of the viscosity and the resistance force against the flow in the weld region.

Figure 7C:
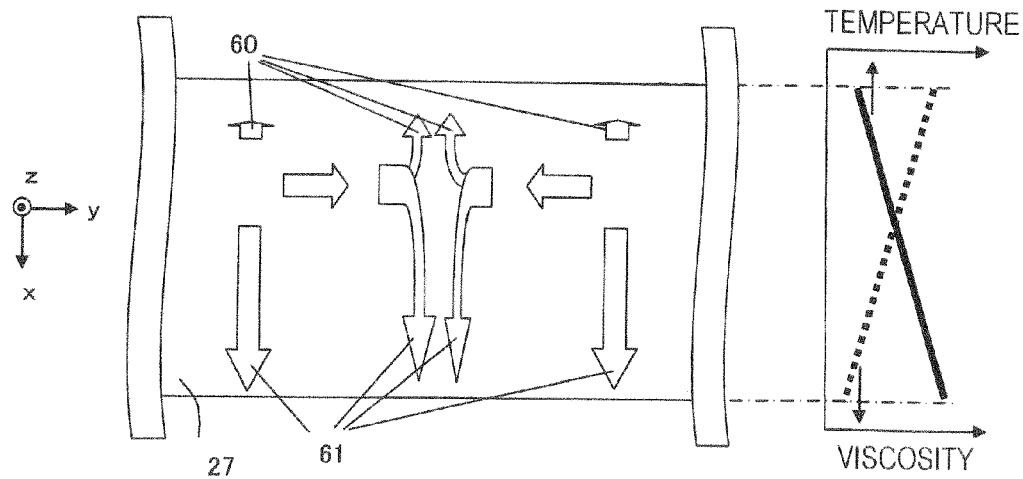

FIG. 7C is a schematic view illustrating the state that a temperature gradient exists in the weld region in the width direction (x-axis direction in FIG. 7C). Assuming for example that a temperature becomes higher in the weld region in the x-axis positive direction, a viscosity lowers and the resistance force against the flow also lowers, respectively in the x-axis position direction. As a pressure is applied in mutually pushing direction to the lens and housing, more molten resin flows in the x-axis positive direction toward the lower resistance force region, as illustrated by arrows 60 and 61. It is therefore possible to form more burring in the x-axis positive direction.

By forming a temperature gradient in the weld region in the width direction in the manner described above and forming deviation of the viscosity and the resistance force against the flow, it will be possible to flow molten resin in the low resistance force direction and form burring preferentially on one side of the weld region. In the following embodiment, laser beam welding is performed to form burring preferentially on one side of the weld region in accordance with the above-described principle.

Figure 8A:
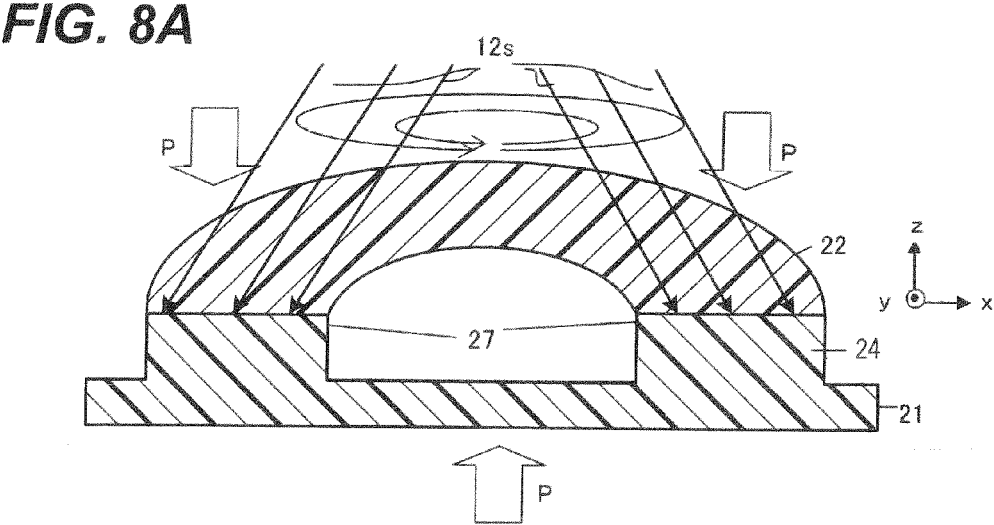
FIGS. 8A to 8C are a schematic cross sectional view illustrating welding by radiating a laser beam to a weld region disposed on a two-dimensional plane and forming a temperature gradient in a width direction of the weld region, a plan view of a weld plane, and a graph illustrating general or overall change in average temperatures of the respective weld lines.

FIG. 8A is a schematic cross sectional view illustrating a processing target product having a weld region disposed on a two-dimensional plane. A lens 22 made of light transmitting resin is disposed on a housing 21 made of light absorbing resin, with both the weld regions facing each other. In this example, a rib 24 for welding is formed on a partial upper surface of the housing. The rib 24 is not an essential constituent element. The lower surface of the lens 22 and the rib 24 formed on the upper surface of the housing 21 are pressured and contacted by a pressure P. A laser beam 12s transmits through the lens 22 and radiates the upper surface of the rib 24 formed on the housing 21. A radiation position is scanned along the rib (weld region) by driving the galvano mirrors. A plane on which the weld region is disposed is represented by an xy plane. In the structure illustrated in FIG. 1A, the first galvano mirror 14 performs x-direction scanning, and the second galvano mirror 15 performs y-direction scanning.

Figure 8B:
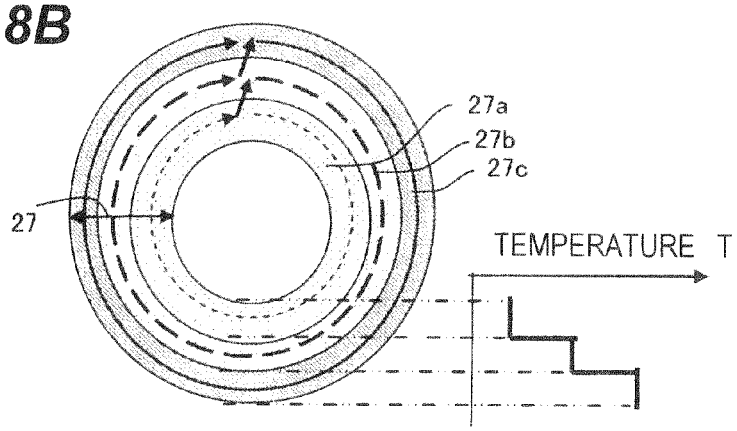

FIG. 8B is a schematic diagram illustrating a two-dimensional weld region 27 of a loop shape illustratively drawn as a circular stripe shape. In this example, three weld lines are defined in the width direction of the weld region, and are sequentially subjected to repetitive laser beam radiation. First, a laser beam is repetitively radiated to the weld line 27a. The weld line 27a is heated, as shown by the temperature change illustrated in the graph of FIG. 1E, passing the softening state, and entering a molten state, and then is allowed to lower its temperature after the end of the radiation. In this case, efficient gap removal will not occur because the weld lines 27b and 27c are not still radiated with a laser beam and are in the solid phase.

Immediately thereafter, before the temperature of the weld line 27a lowers and the weld line 27a takes the solid phase, a laser beam is repetitively radiated to the weld line 27b to heat and melt the weld line 27b. Similarly, before the temperatures of the weld lines 27a and 27b lower and the weld lines 27a and 27b take the solid phase, a laser beam is repetitively radiated to the weld line 27c to heat and melt the weld line 27c.

At this time the whole weld region enters the molten state. Applying a pressure allows gaps to be removed efficiently. Since the temperatures of the weld lines 27a and 27b lower by natural cooling because of time lapse after the end of laser beam repetitive radiation, the weld region has deviations in the temperature and viscosity. As seen from the graph schematically illustrated in FIG. 8B, the temperature distribution in the weld region will have a stepwise gradient from the weld line 27a to weld line 27c. Pressured molten resin will flow toward the weld line 27c having a higher temperature and a lower resistance force, and more molten resin will be expelled to the outer circumference of the weld region.

Figure 8C:
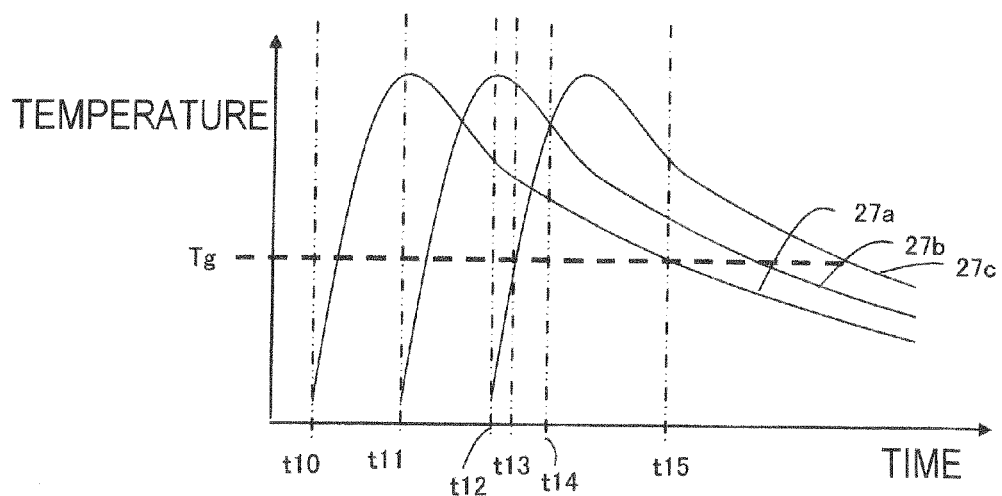

FIG. 8C is a graph schematically illustrating a time change in an average temperature at each weld line. Specifically laser beam repetitive radiation causes repeated temperature rise and fall to gradually heat each weld line. In this graph, averaged temperature change, averaged over the repetitive temperature rise and fall by laser beam repetitive radiation, is illustrated. A temperature (glass transition temperature) necessary for melting the housing is represented by Tg.

From time t10 to t11, the melt line 27a is gradually heated by laser beam repetitive radiation to reach a temperature sufficiently higher than the glass transition temperature Tg and enter the molten state. At time t11 laser beam repetitive radiation transits from the weld line 27a to weld line 27b, and the temperature of the weld line 27a starts lowering by natural cooling. At this time, since the weld lines 27b and 27c are not radiated with a laser beam, efficient gap removal will not occur.

From time t11 to t12, the weld line 27b is gradually heated and melted by laser beam repetitive radiation. At time t12 laser beam repetitive radiation transits from the weld line 27a to weld line 27b, and the temperature of the weld line 27a starts lowering by natural cooling. At this time, since the weld line 27c is not radiated with a laser beam, efficient gap removal will not occur.

From time t12 to t13, the weld line 27c is heated by laser beam repetitive radiation. At time t13 the weld line 27c reaches the glass transition temperature Tg, and heated also after time t13. Since the whole weld region enters the molten state, both the resin members melt together, and efficient gap removal becomes possible by the applied pressure.

From time t14 to t15, as seen from the graph schematically illustrated in FIG. 8B, laser beam radiation with shifted timings forms a stepwise temperature gradient sequentially taking a high temperature from the weld line 27a to weld line 27c. Basing upon the relation between the temperature, viscosity and resistance force of liquid, the pressured molten resin flows toward the weld line 27c having a higher temperature and a lower resistant force, and more molten resin is expelled to the outer circumference of the weld region. After time t15, because of natural cooling, the temperature becomes lower than the glass transition temperature sequentially in the order from the weld line 27a to weld line 27c, to make each weld line have the solid phase. In the solid phase, deformation and fluidity of resin will not occur, and the molten resin expelled to the outside of the weld region is solidified to leave burrings. In the final state, the weld region is bonded firmly, and burring is formed preferentially on one side of the weld region.

As above, a laser beam is scanned at high speed to heat and melt a weld line, and the laser beam radiation position is moved sequentially to another weld line still not radiated with a laser beam, before the heated and melted weld line lowers its temperature to become a solid phase. The whole weld region is heated and melted simultaneously and a temperature gradient is formed in the weld region due to the difference of laser beam radiation. Namely, a plurality of weld lines along the extension direction of the weld region are defined in the width direction of the weld region, and respective weld lines are given respective time (timing) difference of heating and melting and cooling to form a temperature gradient in the width direction of the weld region. Deviations are therefore formed in the viscosity and the resistance force against the flow of molten resin. It is therefore possible to expel more molten resin to the higher temperature side in the weld region, and at the same time to remove gaps efficiently and obtain enhanced bonding.

The present inventors performed test radiation by forming samples as test pieces. The sample had a rib width of 3 mm and a rib length of 15 cm. The lens was made of PMMA and the housing was made of ASA. Welding was performed by setting three weld lines in the width of the rib and scanning the center of each line a plurality of times at a laser output of 190 W and a scan velocity of 10 m/sec. The diameter of a radiated laser beam was set to 2 mm and 3 mm. In this test radiation, an interval of about 0.1 second was inserted to simulate the welding process in a portion of a real product. The destruction test after the welding process indicated the destruction mode that no cleavage was observed in the weld region along the whole length and enhanced weld was obtained. It was observed that burring was formed on the outer side of the test piece.

In this test radiation, three weld lines were set at an equal pitch on the weld region having a rib width of 3 mm. Since the laser beam diameter is 2 mm and 3 mm, the regions near the borders of weld lines are doubly heated. A laser beam has generally an intensity distribution (e.g., Gauss distribution). In the regions near the borders of weld lines, a radiated energy density is lower than at the laser beam center, and a raised temperature is relatively low. Duplicate radiation in the regions near the borders of weld lines will compensate relatively insufficient heating caused by the lower energy density than at the laser beam center. The temperature near the borders of weld line will take an intermediate temperature between the temperatures at the centers of adjacent weld lines. The temperature gradient in the whole weld region may not be stepwise as illustrated in FIG. 8B, but rather a gently and continuous temperature gradient in reality.

In this embodiment, although the two-dimensional weld region is used, the embodiment is applicable also to the three-dimensional weld region.

Selective formation of burring in the weld region is promoted, when the following method is combined to the embodiments.

For example, for a weld line on the side of forming burring and having a higher temperature in the weld region, a scan velocity of a laser beam may be lowered to increase a light absorbing amount and the heat generation per unit area of light absorbing resin and promote the temperature gradient in the weld region. The control apparatus 16 illustrated in FIG. 1A may perform scan velocity control of a laser beam.

There is also a method of promoting the temperature gradient in a weld region by monotonically changing the width of the weld lines in the weld region. Narrower weld line will be heated to a higher temperature. If these methods are adopted, a laser beam may not be scanned such that the respective weld lines are heated to a molten state sequentially, but may be scanned such that the respective weld lines are simultaneously radiated to be heated simultaneously with a temperature gradient given by the difference of heat generation per unit area.

Figure 9:
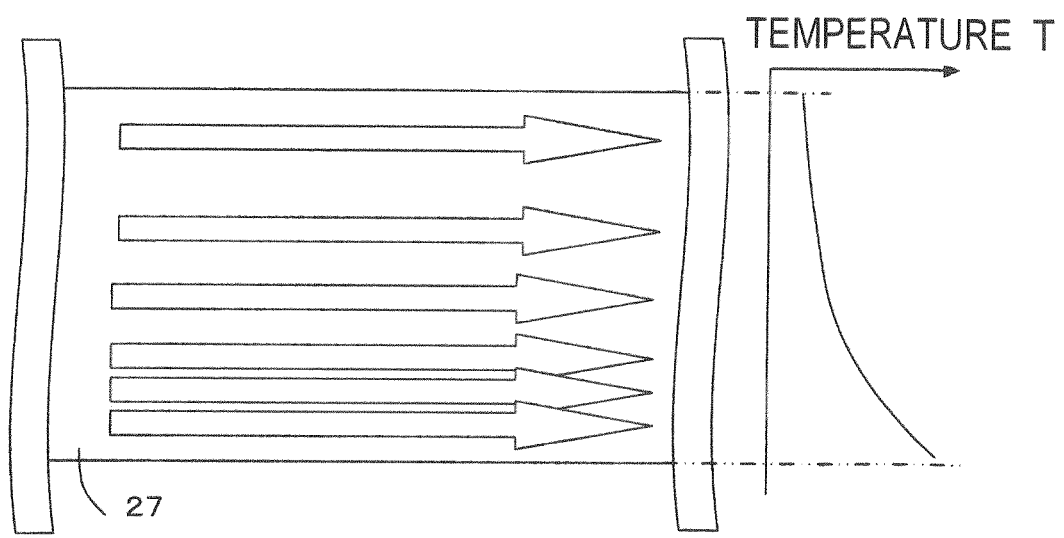
FIG. 9 is a diagram illustrating a modification of welding with temperature gradient in the width direction of the weld region by laser beam repetitive radiation.

FIG. 9 is a schematic diagram illustrating a portion of a weld region in the molten state. Arrows indicate loci or weld lines to be subjected to laser beam repetitive radiation. A weld line width is monotonically decreased (the number of weld lines per unit area is monotonically increased) toward the burring formation side. The laser beam diameter is sequentially reduced in accordance with the weld line width. For example, heating and melting of each weld line is performed by sequentially shifting toward the burring formation side. Since the heat generation per unit area on the burying formation side becomes relatively large, it is possible to promote a temperate gradient in the weld region as illustrated in a schematic graph at the right in FIG. 9. In this case, the method of forming a temperate gradient in the weld region width direction may not be accompanied with forming a temperature gradient by utilizing a time (timing) difference of heating/cooling of the respective weld lines. For example, a laser beam may sequentially radiated to weld lines from one side to the other side, and this sequence may be repeated to heat and melt the whole weld region. Each weld line is heated and melted uniformly. Since the weld line width is monotonically decreased toward the burring formation side, the heat generation per unit area on the burring formation side becomes relatively large, and a temperature gradient can be formed in the weld region width direction.

A temperature gradient may be promoted in the weld region, by radiating laser beams having different energy densities at the same time.

The embodiments have been described above. The invention is not limited to the embodiments. For example, a combination of a light transmitting resin member and a light absorbing resin member is not limited to a lens and a housing. A show case for a small precious product such as gem may be formed. Various other applications are possible. It will be obvious for those stilled in the art that it is possible to make various alterations, replacements, improvements, combinations and the like.

What are claimed are:

1. A method for manufacturing a resin mold assembly, the method comprising:

disposing a light transmitting resin member on a light absorbing resin member in such a manner that a first weld region of the light transmitting resin member faces a second weld region of the light absorbing resin member;

applying pressure between the light transmitting resin member and the light absorbing resin member to bring the first weld region of the light transmitting resin member and the second weld region of the light absorbing resin member into pressed contact in a mutually facing direction;

providing (i) an optical system which includes a focus adjusting system adapted to adjust a focal distance of an incoming laser beam, and (ii) galvano mirrors which are disposed downstream of the focus adjusting system and which are adapted to two-dimensionally scan the incoming laser beam; and applying a laser beam through the light transmitting resin member disposed on the second weld region of the light absorbing resin member, while adjusting the focal distance of the laser beam relative to the second weld region by the focus adjusting system, and scanning the laser beam two-dimensionally over a whole area of the second weld region by the galvano mirrors, to repetitively radiate the laser beam on the second weld region so as to heat, from an ambient temperature, and melt an entirety of the first weld region and the second weld region simultaneously, thereby welding the light transmitting resin member and the light absorbing resin member.

2. The method for manufacturing a resin mold assembly according to claim 1, wherein a focal point of said laser beam is defocused from an interface between said first weld region and said second weld region.

3. The method for manufacturing a resin mold assembly according to claim 1, wherein during said scanning, a plurality of weld lines are defined on the second weld region, and said scanning is done along the respective weld lines.

4. The method for manufacturing a resin mold assembly according to claim 1, wherein said light transmitting resin member is a lens, and said light absorbing resin member is a housing.

5. The method for manufacturing a resin mold assembly according to claim 1, wherein said light absorbing resin member is radiated with the laser beam a plurality of times at a same position in said second weld region, until a glass transition temperature is reached, and further radiated with the laser beam a plurality of times until a molten state is reached.

6. The method for manufacturing a resin mold assembly according to claim 1, wherein a contact surface between said first weld region and said second weld region has a three-dimensional structure, and an incidence angle of said laser beam upon said contact surface changes with a position and a scan velocity of said laser beam is changed with the position so as to average a heating temperature.

7. The method for manufacturing a resin mold assembly according to claim 1, wherein an incidence angle of said laser beam upon a virtual flat plane in contact with said second weld region changes with a position, and a scan velocity of said laser beam is changed so as to average a heating temperature.

8. The method for manufacturing a resin mold assembly according to claim 1, wherein said light transmitting resin member has a rib on an opposing surface to said light absorbing resin member, and said rib has a width of 2 mm to 3 mm and a height of 0.5 mm to 1 mm.

9. The method for manufacturing a resin mold assembly according to claim 1, wherein contact surfaces of said first and second weld regions have a slope angle in a width direction.

10. The method for manufacturing a resin mold assembly according to claim 2, wherein:
the second weld region has a loop shape;
a plurality of weld lines are defined in a width direction along an extending loop direction of said second weld region; and
a temperature gradient is formed in the width direction of the second weld region in a state in which the laser beam is respectively radiated on the plurality of weld lines of the second weld region.

11. The method for manufacturing a resin mold assembly according to claim 10, wherein said temperature gradient is formed by controlling a radiation timing of said laser beam.

12. The method for manufacturing a resin mold assembly according to claim 10, wherein said plurality of weld lines are defined to have an equal width, and said laser beam is radiated repetitively on each of the weld lines to sequentially heat and melt the respective weld lines from a first side to a second side of said second weld region along the width direction.

13. The method for manufacturing a resin mold assembly according to claim 10, wherein an energy density of said laser beam is changed for each of said plurality of weld lines.

14. The method for manufacturing a resin mold assembly according to claim 10, wherein widths of said plurality of weld lines are monotonously decreased from a first side to a second side of said second weld region along the width direction.

15. The method for manufacturing a resin mold assembly according to claim 10, wherein heating and melting by scanning said laser beam is sequentially performed from one of the weld lines on a first side to another of the weld lines on a second side of said second weld region in the width direction so as to heat and melt an entirety of said first and second weld regions.

16. The method for manufacturing a resin mold assembly according to claim 14, wherein said laser beam radiates one of the weld lines on said first side, and sequentially radiates said weld lines to another of the weld lines on said second side, and this sequence of radiation is performed repetitively to heat and melt an entirety of said first and second weld regions.

17. The method for manufacturing a resin mold assembly according to claim 13, wherein a scan velocity of said laser beam repetitively radiating said weld lines is changed for each of said weld lines.

18. The method for manufacturing a resin mold assembly according to claim 10, wherein said laser beam has a diameter one to three times larger than a width of each of said weld lines.

19. A method for manufacturing a resin mold assembly, the method comprising:
disposing a light transmitting resin member on a light absorbing resin member in such a manner that a first weld region of the light transmitting resin member faces a second weld region of the light absorbing resin member;
applying pressure between the light transmitting resin member and the light absorbing resin member to bring the first weld region of the light transmitting resin member and the second weld region of the light absorbing resin member into pressed contact in a mutually facing direction; and
applying a plurality of laser beams through the light transmitting resin member on the second weld region of the light absorbing resin member, wherein the second weld region is divided into a plurality of sections and each of the plurality of laser beams is assigned to a respective one of the plurality of sections, and scanning the laser beams in their respectively assigned sections, over a whole area of the second weld region, to repetitively radiate the laser beams on the second weld region so as to heat and melt an entirety of the first weld region and the second weld region simultaneously, thereby welding the light transmitting resin member and the light absorbing resin member.

20. The method for manufacturing a resin mold assembly according to claim 19, wherein said second weld region is divided into the plurality of sections in a width direction thereof, and said plurality of laser beams radiate positions of the weld regions which are different along the width direction.

21. The method for manufacturing a resin mold assembly according to claim 19, wherein said second weld region is divided into a plurality of weld lines along a width direction thereof, and the plurality of laser beams have different optical intensities and radiate the plurality of weld lines so as to establish a temperature gradient along the width direction of the second weld region.

22. A method for manufacturing a resin mold assembly, the resin mold assembly comprising a light absorbing resin part having a first weld region having a loop shape, and a light transmitting resin part having a second weld region corresponding to said first weld region, the method comprising:

disposing the light transmitting resin part on the light absorbing resin part such that the first weld region faces and receives the second weld region;

applying pressure between the light transmitting resin part and the light absorbing part to bring the first weld region and the second weld region into pressed contact in a mutually facing direction;

setting a plurality of weld lines along a width direction of the first weld region having the loop shape;

providing (i) an optical system which includes a focus adjusting system adapted to adjust a focal distance of an incoming laser beam, and (ii) galvano mirrors which are disposed downstream of the focus adjusting system and which are adapted to two-dimensionally scan the incoming laser beam; and applying a laser beam through the light transmitting resin part disposed on the first weld region, and scanning the laser beam along the plurality of weld lines repetitively so as to scan an entire area of the first weld region and establish a temperature gradient in the width direction of the first weld region, so as to heat and melt an entirety of the first weld region and the second weld region simultaneously, thereby welding the light transmitting resin part and the light absorbing resin part.

23. The method for manufacturing a resin mold assembly according to claim 22, wherein:

a focal point of said laser beam is defocused from an interface between said first weld region and said second weld region;

the second weld region has a loop shape;

a plurality of weld lines are defined along a width direction of said second weld region; and a temperature gradient is formed in a width direction of the second weld region in a state in which the laser beam is repetitively radiated on the second weld region.

24. The method for manufacturing a resin mold assembly according to claim 22, wherein a temperature of the first weld region is monotonously decreased from a first side to a second side thereof along the width direction.

25. The method for manufacturing a resin mold assembly according to claim 22, wherein scanning of the laser beam is controlled to change at least one of a radiation timing, a radiation time, an energy density, and a scan speed for the plurality of weld lines.

* * * * *